US012558278B2

(12) United States Patent
Bertrand et al.

(10) Patent No.: US 12,558,278 B2
(45) Date of Patent: Feb. 24, 2026

(54) ASSEMBLY FOR TRANSLATIONAL MOVEMENT OF WHEELCHAIR WHEELS FOR PERSONS WITH MOTOR DISABILITIES

(71) Applicants: Claude Bertrand, Arzay les Portes de Bonnevaux (FR); Jean Bernasconi, Paris (FR)

(72) Inventors: Claude Bertrand, Arzay les Portes de Bonnevaux (FR); Jean Bernasconi, Paris (FR)

(73) Assignee: TRUSTIS, Sainte-Foy-lès-Lyon (FR)

( * ) Notice: Subject to any disclaimer, the term of this patent is extended or adjusted under 35 U.S.C. 154(b) by 563 days.

(21) Appl. No.: 17/926,126

(22) PCT Filed: May 17, 2021

(86) PCT No.: PCT/FR2021/050851
§ 371 (c)(1),
(2) Date: Nov. 17, 2022

(87) PCT Pub. No.: WO2021/234259
PCT Pub. Date: Nov. 25, 2021

(65) Prior Publication Data

US 2023/0172781 A1 Jun. 8, 2023

(30) Foreign Application Priority Data

May 19, 2020 (FR) .................................... 20 05116

(51) Int. Cl.
*A61G 7/10* (2006.01)
*A61G 5/10* (2006.01)

(52) U.S. Cl.
CPC ............ *A61G 7/1036* (2013.01); *A61G 5/10* (2013.01)

(58) Field of Classification Search
CPC ...... A61G 7/10; A61G 7/1025; A61G 7/1036; A61G 5/02; A61G 5/10; A61G 5/1005;
(Continued)

(56) References Cited

U.S. PATENT DOCUMENTS 5,520,403 A * 5/1996 Bergstrom .......... A61G 5/0825 280/42
2004/0080137 A1 4/2004 Kuntz
(Continued)

FOREIGN PATENT DOCUMENTS

CN 112587320 A * 4/2021 .............. A61G 5/00
DE 10 2008 013453 10/2009
(Continued)

OTHER PUBLICATIONS

International Search Report dated Aug. 6, 2021.

*Primary Examiner* — Jacob S. Scott
(74) *Attorney, Agent, or Firm* — IPSILON USA, LLP

(57) ABSTRACT

Assembly or kit which is adaptable to an ordinary manually driven wheelchair, comprising one or two devices comprising a guide (1) provided with quick attachment means, a wheel slide (15) having a transverse bearing for a rear wheel which rotates between an advanced position and a retracted position, in which the rear wheel does not project beyond the side of the seat, an articulated elongate lever (28) having snap-fitting elements (23, 25) which are spaced apart by a distance equal to the distance between the advanced and retracted positions, and which can be snap-fitted with a complementary snap-fitting element (10) in these positions, and a means (10) for holding the lever in a non-snap-fitted position, the movement of the slide (15) releasing it automatically from the holding means (10).

21 Claims, 13 Drawing Sheets

(58) Field of Classification Search
CPC ... A61G 5/1013; A61G 5/1018; A61G 5/1054
See application file for complete search history.

(56) References Cited

U.S. PATENT DOCUMENTS

| | | | | |
|---|---|---|---|---|
| 2010/0133779 | A1 | 6/2010 | Sim | |
| 2016/0175174 | A1 | 6/2016 | Drasler et al. | |
| 2020/0405556 | A1 * | 12/2020 | Henderson | A63G 4/00 |
| 2021/0401645 | A1 * | 12/2021 | Jei | A61G 5/1054 |

FOREIGN PATENT DOCUMENTS

| | | | | |
|---|---|---|---|---|
| EP | 1192924 | | | 4/2002 |
| EP | 3120818 | | | 1/2017 |
| EP | 3323400 | | | 5/2018 |
| EP | 3412267 | | | 12/2018 |
| FR | 1501566 | | | 11/1967 |
| FR | 2995209 | | | 3/2014 |
| GB | 2141980 | | | 1/1985 |
| JP | H0523370 | A | * | 2/1993 |
| JP | H10234966 | | | 9/1998 |
| JP | H11226057 | | | 8/1999 |
| JP | 2009 178492 | | | 8/2009 |
| JP | 2009178492 | A | * | 8/2009 |
| JP | 2011104317 | | | 6/2011 |
| WO | WO 2008136777 | A | * | 11/2008 |

* cited by examiner

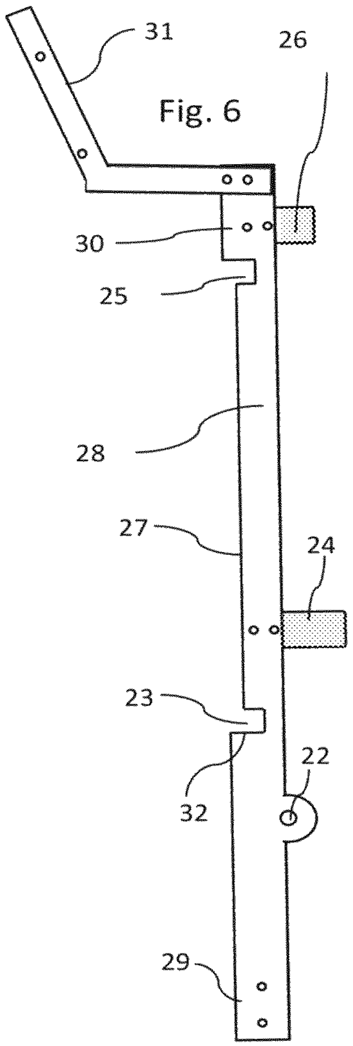
Fig. 6
Fig.7
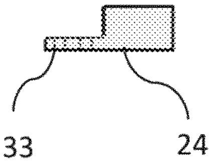
Fig.8
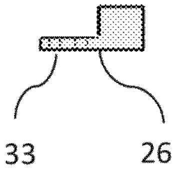
Fig. 9
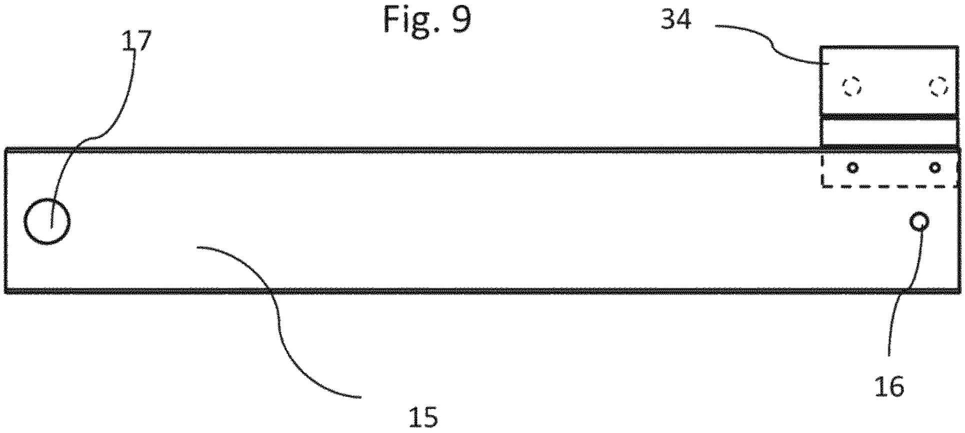

Fig. 10
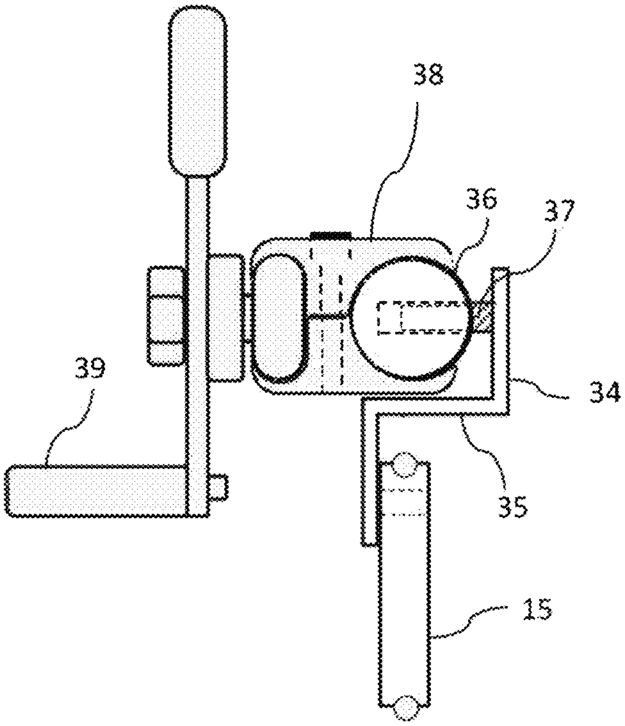
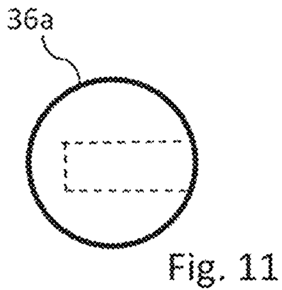
Fig. 11
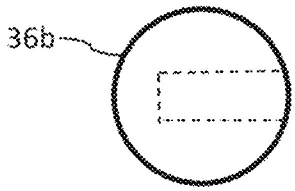
Fig. 12

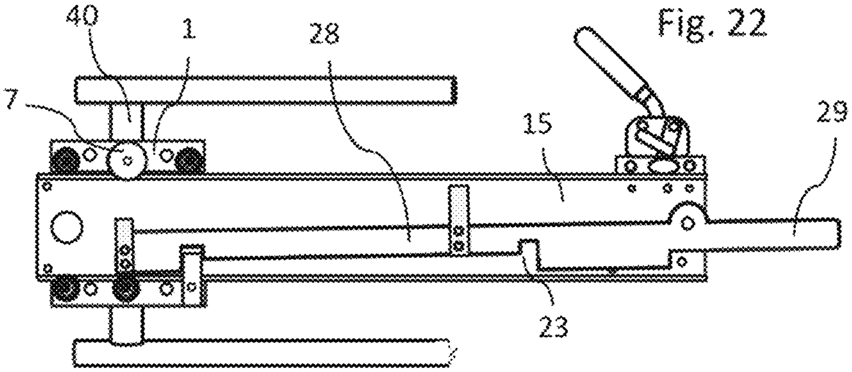
Fig. 22
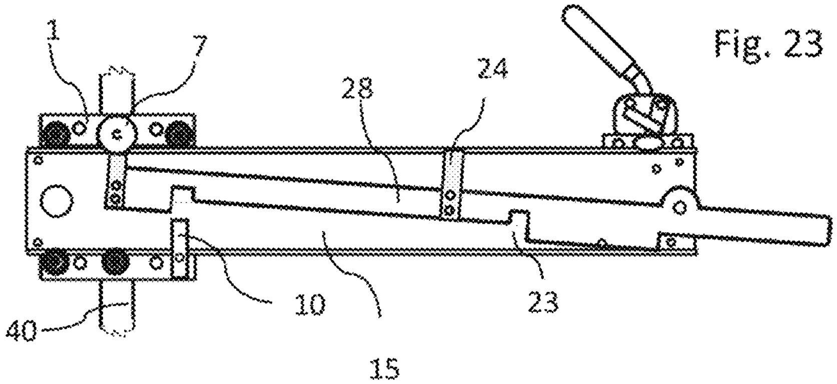
Fig. 23
Fig. 24
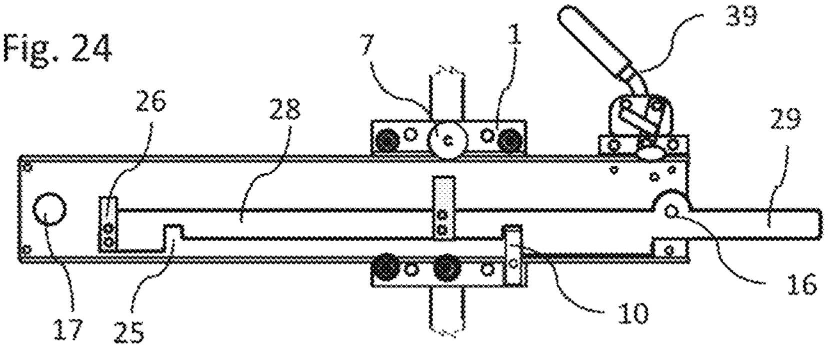

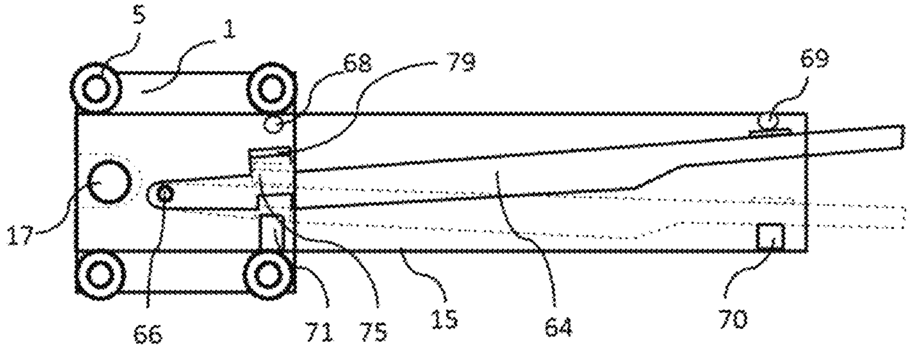
Fig.30
Fig.31
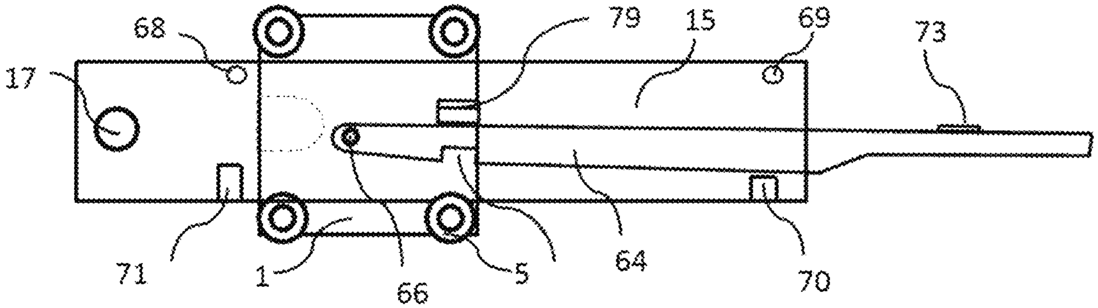
Fig.32
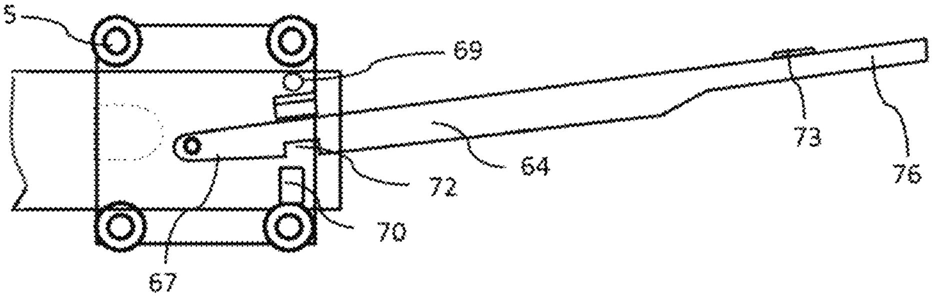

ASSEMBLY FOR TRANSLATIONAL MOVEMENT OF WHEELCHAIR WHEELS FOR PERSONS WITH MOTOR DISABILITIES

RELATED APPLICATION

This application is a National Phase of PCT/FR2021/050851 filed on May 17, 2021, which claims the benefit of priority from French Patent Application No. 20 05116, filed on May 19, 2020, the entirety of which are incorporated by reference.

FIELD OF THE INVENTION

The present invention concerns an assembly, in particular in kit form, for a manually-driven wheelchair for a person with motor disabilities, facilitating lateral transfer of the user to or from the chair.

PRIOR ART

Manually-driven wheelchairs have large-diameter rear wheels in order to enable manual driving by the circular push rings on the wheels. These wheels form an obstacle to the lateral transfer of the handicapped person between the seat of the chair and another adjacent seat.

Manually-driven wheelchairs have already been described in which one or both large-diameter rear wheels are mounted on parts sliding horizontally on the rest of the chassis, which enables the wheels to be retracted between a normal position of use and a retracted position freeing the lateral side of the seat to facilitate the transfer of the handicapped person. Chairs of this kind are described in US 2010/133779, US 2004/080137, DE 10 2008 013453 and JP 2011 104317. They in particular have a longitudinal overall size projecting rearwards. Moreover, unlocking in the advanced and retracted positions is complicated for the user, who has to actuate the wheels at the same time. The same applies to JP 10/234966 and JP 11/226057. EP 1192924 describes a wheelchair necessitating the presence of rear castor wheels and means for raising the seat to enable sliding of the large rear wheels. GB 2141980 describes a wheelchair with a complex sliding chassis.

FR 2995209 and JP 2009 178492 describe wheelchairs in which actuation and unlocking of the wheels between these two positions are effected by complicated driving mechanisms. Moreover, JP 2009 178492 describes a telescopic sliding device that is less bulky in the longitudinal direction but complex and necessitates actuation by means of levers.

FR 15/01566 and EP 3120818 describe an assembly solving these problems that may take the form of a kit easy to mount on most existing manually-driven wheelchairs, the elongated slide length being such that, in the rear or retracted position, it is able to exit with an overhang the rear end of the guide, which does not project much or at all from the rear of the chair, the slide remaining secured in the guide by its anterior part.

FR 16/01635, FR 17/00045 and EP 3323400 describe assemblies of this kind in which unlocking the rear wheels to enable the user to move the rear wheels and then to fix them in the advanced and retracted positions are particularly practical.

FR 17/00593 and EP 3412267 describe assemblies of this kind that are particularly light in weight.

However, although relatively compact and able to be mounted on most existing wheelchairs, these assemblies also have a thickness that increases the distance between the large rear wheels, which can sometimes impede passage through doors or along narrow passages.

OBJECTS AND SUMMARY

The present invention proposes to remedy these drawbacks and to provide a very light assembly of this kind that is even easier to mount on most existing wheelchairs, is of great simplicity and allows the distance between the rear wheels to be maintained, this assembly being also of simple construction and easy to fit.

The invention has for object an assembly or kit that can be fitted to an ordinary wheelchair driven manually by circular push rings on the wheels, including one or two devices including two parts mobile relative to one another, namely a guide provided with quick fixing means, in particular by clamping, in horizontal position, a wheel slide guided by said guide and having a transverse axle or sleeve on and in which a rear wheel can be mounted so that the rotation of said rear wheel drives the movement of the slide along the guide between a normal rolling advanced position and a retracted position in which the rear wheel no longer protrudes on the side of the seat of the chair, means for manually actuating immobilization of the slide in said advanced, respectively retracted, positions, the length of said elongate slide being such that, in the rear or retracted position, it can exit the rear end of the guide with an overhang, the slide remaining retained in the guide by its anterior part, said advanced and retracted position immobilization means including manually unlockable clipping means and unclipped position retaining means enabling the user to free their hands to drive said wheel of the chair between said advanced and retracted positions, and automatic unlocking means enabling return of the clipping means into the clipping position upon movement of the wheel slide, characterized in that said clipping means (10, 23, 25) include an elongate lever (20, 28) articulated in pivoting manner on one of said parts (1, 15), preferably in a substantially vertical plane, and actuatable by a hand lever or handle (21, 31), said lever (20, 28) and the part (1, 15) that does not carry said lever including respective complementary clipping elements (10, 24, 26), namely two elements (24, 26) spaced by a distance equal to the distance between said advanced and retracted positions, and an element (10) adapted to be clipped together when said slide (15) reaches the advanced, respectively retracted, position, said lever (20, 28) being able to pivot between an unclipped position and a clipped position.

A. In a preferred embodiment said clipping means include an elongate lever articulated to pivot on the slide, preferably in a substantially vertical plane, and actuated by a hand lever or handle, said lever having clipping elements spaced by a distance equal to the distance between said advanced and retracted positions able to be clipped to a complementary clipping element when said slide reaches the advanced, respectively retracted, positions, said lever being able to pivot between a not-clipped position and a clipped position.

B. In another embodiment the lever is articulated to the fixed guide (1), preferably in a substantially vertical plane, the slide (15) including said spaced clipping elements, the lever then including said complementary clipping element (10).

The following features may be applied individually or in combination to the above two embodiments A and B unless it is specified that they apply only to the form A or to the form B.

By horizontal position is meant a position that is horizontal or slightly inclined, preferably rearwardly, at an angle of 0 to 5°.

The automatic unlocking means making it possible to move the clipping means into the clipping position upon movement of the wheel slide may for example include a spring for returning the lever to the clipped position. However, these means preferably simply consist in a position of the articulation of the lever enabling it to return to the clipped position by gravity alone after the movement of the slide has moved it away from the retaining means.

According to the feature A, the lever is preferably articulated to the slide and carries said spaced clipping elements, the guide carrying the complementary clipping element.

The articulation is preferably situated toward one of the ends of the lever, more preferably toward the front end.

In a particularly preferred embodiment the articulated lever features clipping reliefs, holes or notches separated along the lever by a distance corresponding to the travel of the slide between the advanced and retracted wheel positions and intended to be clipped into a complementary notch, hole or relief that the guide preferably includes. In a particularly preferred manner the lever therefore has two notches in its lower edge so that once raised and moved slightly by the movement of the slide the lower edge of the lever slides on the fixed relief until the other notch arrives above the fixed relief and is clipped thereto, preferably by gravity alone.

The means for maintaining the unclipped position are preferably magnetic means, preferably consisting of a single magnet, preferably in the form of a small vertical disc. In the situation which is preferred in accordance with the feature A in which the lever has clipping notches or reliefs on its lower edge, these means include a single fixed magnet preferably carried by the guide above the trajectory of the lever, the upper edge of which includes at the level of each hole or notch a ferromagnetic part that can be pressed against the magnet when the lever is raised, the ferromagnetic part situated at the level of the notch corresponding to the normal advanced wheel position being farther from the longitudinal geometric axis of the lever than the other one, in order to compensate even its least amplitude of movement upon rotation of the lever, in the preferred situation where the articulation axis of the lever is situated outside the distance separating the clipping elements of the lever. Of course, in a variant it is the lever that may carry two magnets cooperating with a fixed ferromagnetic part.

In the case of the feature B these means include two magnets preferably carried by the slide and able to cooperate with two ferromagnetic parts carried by the lever.

The means for maintaining the unlocked position therefore procure automatic unlocking of the lever, which escapes from the magnet when the slide moves from its advanced or retracted position, the lever then returning automatically to the clipping position.

The device preferably includes an abutment means preventing its slide from advancing in the guide beyond its normal advanced rolling position as well as an abutment means preventing it from retracting beyond its retracted position and escaping from the guide. The latter means may simply be formed by a rim of the anterior clipping relief, hole or notch of the lever coming up against a fixed relief, hole or notch and preventing the lever from retracting farther, even in the unclipped raised position.

A notch open toward the rear may advantageously be provided in the guide to receive the rear wheel axle or bearing in its advanced position. The bottom of this notch preferably forms the abutment means preventing forward extraction of the slide.

In a particularly advantageous embodiment the guide includes a thin plane vertical element featuring means on one side for fixing it to a part of the chassis of the chair and on the other side rolling members retaining and guiding the slide, said slide including a thin flat and elongate vertical element retained and guided by said rolling members, preferably above and below its longer edges, the clipping lever having a flat elongate blade shape extending parallel to the slide that can be actuated by a hand lever or handle situated toward the front and/or rear end. The lever is preferably carried by the slide and is preferably articulated to one of the faces of the slide, preferably toward the front of the slide.

This plane element can preferably carry at a certain distance a second flat element that is parallel to it, the slide, the rolling means and the lever being disposed in the space separating the two elements. This second plane element may be connected to the first one by firm connections, for example bolts, which makes it possible to prevent the slide from moving away from the chair in the event of an abnormal load tending to separate it from the rolling means.

This second flat element may advantageously be identical to the first one, which simplifies production.

By a thin plane element of the guide is meant an element, for example a plate, for example from 5 to 12 mm thick, more preferably from 8 to 12 mm thick. The length of the guide is preferably from 8 to 12 cm, the height of the guide being such that the guiding and rolling means that it carries can be located above and below the upper and lower edges of the slide.

The means for fixing the guide to the chassis of the chair are preferably clamping collars or flanges able to clamp an element of the chassis of the chair, for example the vertical rod or bar normally carrying the large rear wheel of the chair, before fitting the assembly according to the invention. These collars or flanges are preferably fixed and tightened by screwing them into holes in the guide.

By a thin and elongate flat element of the slide is meant an element, for example a plate, preferably from 8 to 10 or 12 mm thick. The height of the slide preferably does not exceed 50 to 80 mm; this height is preferably of the order of 50 to 60 mm. The length of the slide is preferably of the order of 30 to 40 cm and the length of the overhang in the retracted position is preferably of the order of 17 to 22 cm.

In one embodiment the rolling and guide members are wheels with a concave, in particular grooved, periphery guiding rounded upper and lower edges of the slide. These edges are preferably formed by rods engaged in elongate grooves on said edges, the thickness or diameter of the rods preferably being of the order of 4 to 6 mm.

In another embodiment the wheels may have a convex periphery, the upper and lower edges of the slide then having a groove in which the wheels roll.

The clipping lever is preferably a flat element extending over a great length of the slide and preferably from 4 to 6 mm thick.

The distance or clearance between two adjacent guide, slide and clipping flat elements is preferably less than or equal to 2 mm.

On its side opposite that facing the guide, the slide may advantageously be provided with a thin concealer, for example less than 5 mm thick.

In a particularly preferred embodiment the fixed transverse axle or sleeve of the slide on which or in which the large rear wheel is mounted emerges from its device by a distance less than that of the fixed corresponding axle or bearing that the chair normally has. This shorter distance is preferably substantially equal to said normal distance less a value substantially equal to the thickness of the slide.

It is preferably between 5 and 20 to 30 mm inclusive.

The invention therefore makes it possible to obtain a total thickness of each of the two devices of the assembly that can be less than or equal to 35 mm, in particular less than or equal to 30 mm, enabling the distance between the two rear wheels after mounting the assembly according to the invention to remain substantially identical to that of the wheelchair before mounting the assembly.

The transfer sleeve mounted toward the rear end of the slide on which a rear wheel can be mounted may advantageously include spaced internal grooves to enable the fixing by clipping of large rear wheel axles of different lengths.

The lever articulated for example to the front of the slide preferably has an extension, hand lever or handle emerging beyond the anterior end of the slide so that the user is able to actuate it and to move it to the unclipped position and/or beyond the rear end of the slide so that a helper is able to actuate it. However, as an alternative, a handle or hand lever may be disposed between the front and rear ends so it can be actuated manually.

The assembly may also include for each device an extendable vertical upright intended to be clamped between lower and upper longitudinal chassis members. This upright preferably includes two sleeves respectively screwed onto a stud, each sleeve having at its free end a flared, for example V-shape, bracket and coming to be pressed against this longitudinal member, or conversely two studs carrying the brackets and a central sleeve, screwing enabling the brackets to be moved farther away from one another and the upright to be clamped vertically against the chassis.

This vertical upright may be used for example to fix, for example by means of flanges, a second guide similar to the first one but with no clipping means and no means for maintaining the unlocked position, coming to be aligned in front of the first guide so as to form a longer guide for retaining in a retracted position a slide supporting a very heavy load.

This upright may also be used to fix the guide itself, for example in the case of a chair chassis not having the usual upright at the level of the large rear wheel axle.

In a preferred embodiment the assembly further includes a preferably removable elongate element or crossmember, for example in the form of a shaft, connecting the rear ends of the two slides of the assembly, preferably in alignment with the axles of the rear wheels. This elongate element may have at each end the fixed transverse bearing of the slide emerging from the device concerned, but it is preferable for the bearing to be fixed directly to the slide, said elongate element being adapted to be fixed by its ends to the slide, preferably at the level of the wheel axles or bearings.

Said elongate element is preferably of adjustable length so it can be mounted after mounting the two devices of the assembly, one on each side of the wheelchair.

The slide may preferably further include at its anterior end a part on which a wheel brake may be mounted, preferably the wheel brake initially carried by the chassis of the wheelchair concerned. This part preferably includes a base that can be fixed to the upper edge of the slide and having a lateral flange onto which may be fixed a cylindrical or tubular section having the same diameter as the chassis portion of the chair on which the brake is normally fixed.

The assembly according to the invention may further include a platform, for example in the form of a grid or plate, that comes to rest horizontally on the rear ends of the slides, preferably on the elongate element joining the slides, the anterior edge of this platform being connected to the rear of the chassis of the chair or, at this level, to the slides, so that it is possible to place objects, baggage or other items on this platform.

BRIEF DESCRIPTION OF THE DRAWINGS

Other advantages and features of the invention will become apparent on reading the following description given by way of non-limiting example and with reference to the appended drawings, in which:

FIG. 6 represents a view in elevation of another embodiment of the clipping lever according to the invention, FIG. 7 represents a profile view of posterior ferromagnetic parts for these levers, FIG. 8 represents a profile view of anterior ferromagnetic parts for these levers, FIG. 9 represents a view in elevation of a slide carrying a wheel brake fixing part, FIG. 10 represents a profile view of the slide carrying this fixing part with a wheel brake, FIG. 11 represents a profile view of the brake carrier element of this part with a certain diameter, FIG. 12 represents a profile view of the brake carrier element of this part with a diameter different from the diameter in FIG. 11, FIG. 22 represents a view in elevation of the slide engaged in the guide in an anterior and clipped position, FIG. 23 represents a view in elevation of the slide engaged in the guide in an anterior and unclipped position, FIG. 24 represents a view in elevation of the slide engaged in the guide in a rear and clipped position, FIGS. 30 to 32 represent views in elevation of this assembly in three different positions of the slide.

DESCRIPTION OF EMBODIMENT(S)

Figure 1:
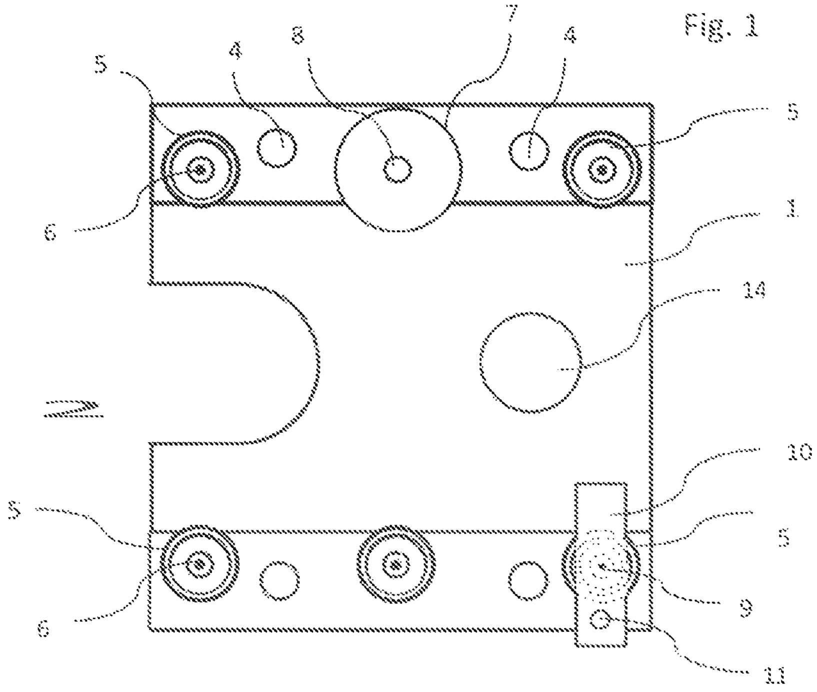
FIG. 1 represents an elevation view of a guide in accordance with the invention.
Figure 2:
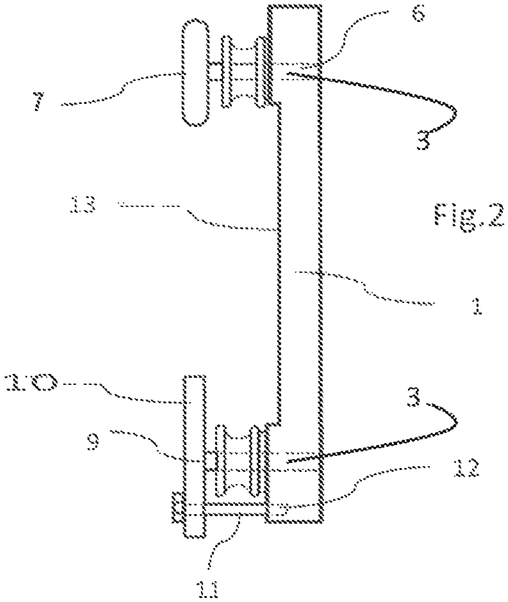
FIG. 2 represents a profile view of this guide.

Referring to FIGS. 1 and 2, there is seen a guide of a device according to the invention including a plane element, such as a plate 1, preferably made of aluminum, having on its rear edge a notch 2 to receive a large rear wheel axle. The plate 1 includes a plurality of holes, preferably threaded holes, close to the upper, respectively lower, edges of the plate, preferably disposed symmetrically relative to the horizontal geometrical axis of the plate, namely two rows of three front, center and rear holes 3 (not visible from front view FIG. 1, into which a wheel axle may be fixed or screwed and two rows of two holes 4 disposed between the corresponding holes 3 and into which flange fixing screws may be screwed or fixed.

Grooved wheels 5 are mounted by screwing or fixing their axles 6 in the holes 3, for example toward the upper edge a rear wheel and a front wheel and toward the lower edge a rear wheel, a center wheel and a front wheel, i.e. five wheels. Six wheels may equally be provided by adding an upper central wheel, or only four wheels, namely two lower wheels and two upper wheels.

Conversely, wheels with a convex periphery, preferably of rounded section, may be used, the slide then having along its lower and upper edges a rectilinear groove, preferably recessed directly into these edges.

At the level of the upper center hole 3 is fixed a magnet 7 of circular shape carried by a rod 8 screwed or fixed in the hole. The rod 8 may also be used to carry a pivoting wheel 5 disposed between the plate 1 and the magnet 7. In the front lower hole 3 there has been fixed by screwing or fixing a rod 9 an abutment part 10 taking the form for example of a small rectangular plate. In order to prevent any rotation of the abutment part 10 the latter may carry a lower rod 11 penetrating into a hole 12 situated close to the lower edge of the plate 1.

The guide plate 1 may feature a hole 14 at the same height as the notch 2 enabling the passage of a large rear wheel axle bearing surface, in particular in the case of certain wheelchairs provided with a non-demountable bearing surface receiving the large rear wheel axle on a rear chassis upright to which the guide 1 is to be fixed.

In some cases, in order to reduce the weight of a plate 1 having a standard thickness, for example of 10 mm, a wide recess 13 may be formed in the plate without modifying the width of the upper and lower edges of the plate. The thickness of the plate at the level of the recess is preferably between 8 and 10 mm.

Figure 3:
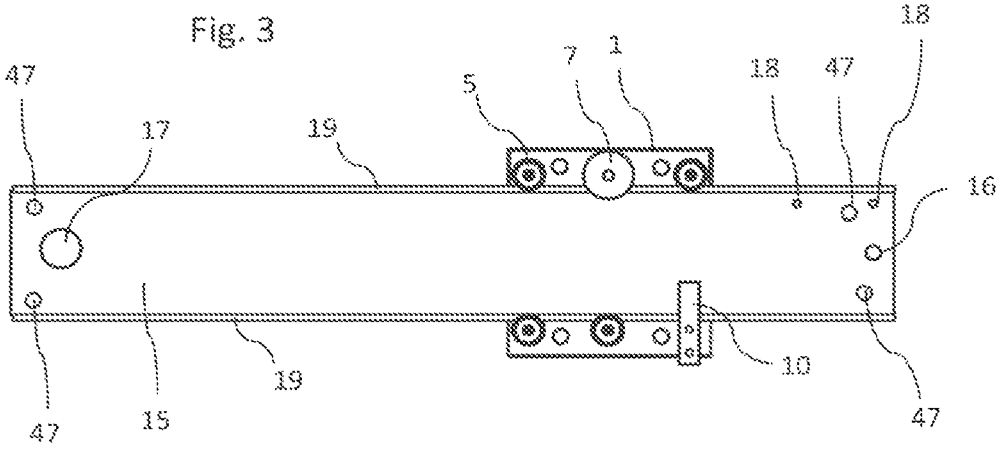
FIG. 3 represents a view in elevation of a slide according to the invention.
Figure 4:
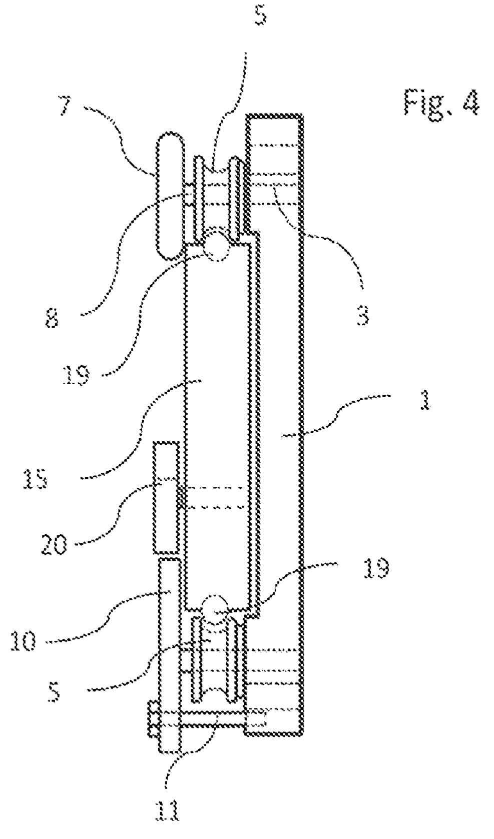
FIG. 4 represents a profile view of this slide mounted on the guide.

Referring to FIGS. 3 and 4 there is seen a slide 15 of this device formed of an elongate rectangular plate, preferably made of aluminum or other amagnetic material and having toward its anterior end a preferably threaded hole 16 able to receive a clipping lever articulation pin, for example by screwing it in. Toward its rear end the slide features a preferably threaded large hole 17 to receive a bearing or shaft for the rotation of a large rear wheel. Toward its front end and in the vicinity of its upper edge the slide has a row of two threaded holes 18 to enable mounting of a wheel brake part represented in FIGS. 10 and 15. Two similar holes may be provided in the vicinity of the lower edge.

The hole 16 is disposed substantially at the mid-height of the plate 15 but it may equally be disposed lower, what is essential being to allow sufficient rotation of the clipping lever to be described.

Figure 15:
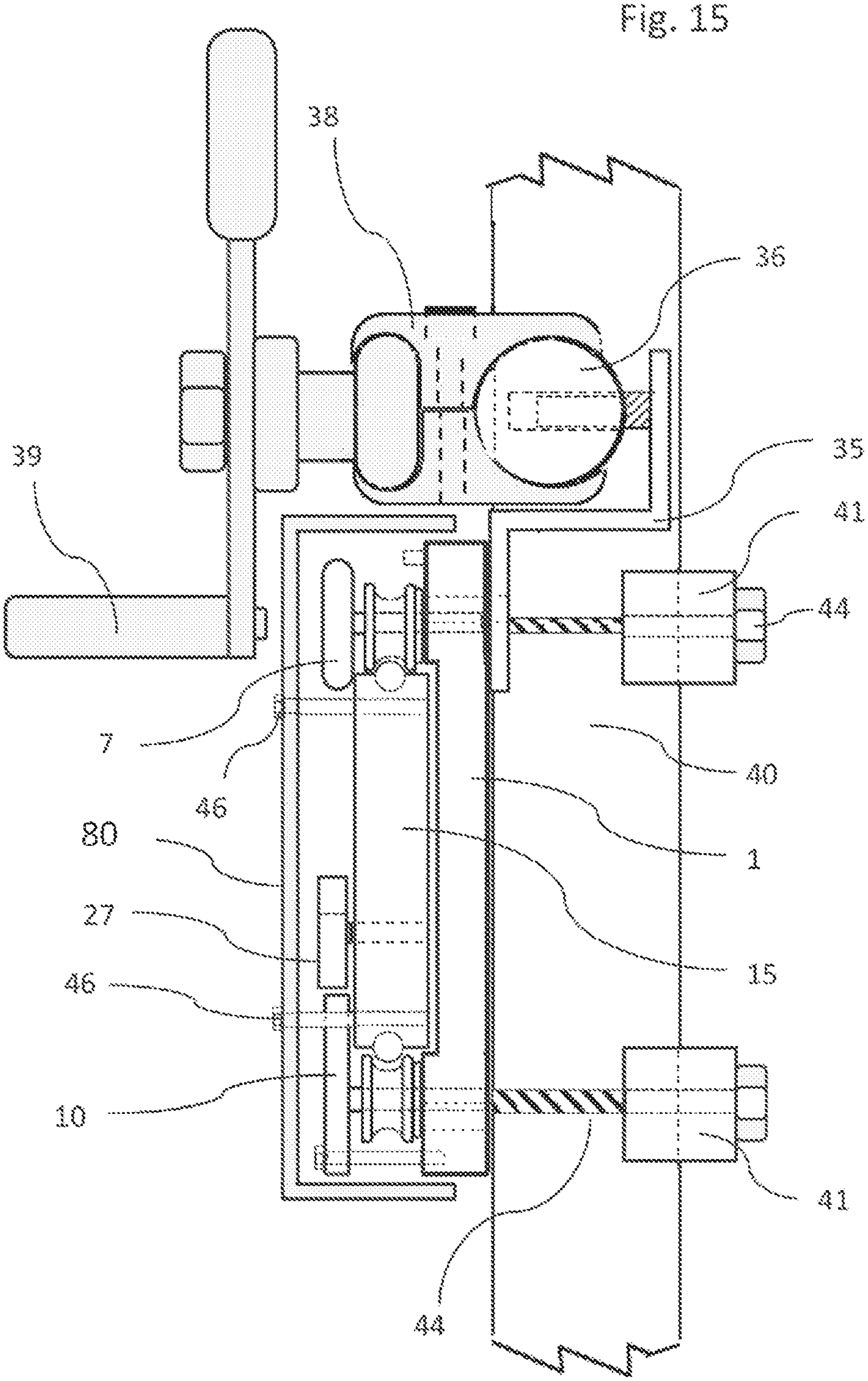
FIG. 15 represents a profile view of the slide engaged in the guide.

It is seen in FIG. 4 that the edge surfaces at the lower and upper edges of the slide plate 15 each feature a milled groove in which is clamped an elongate cylindrical rod 19 preferably made of steel. The rods 19 serve as bearing surfaces for the wheels 5 in the groove of which they are received so that once mounted on the guide 1 as represented in FIGS. 4, 10 and 15 the slide 15 is held so it can only slide horizontally relative to the guide without moving away from or toward the guide 1, as seen in FIG. 4.

Figure 28:
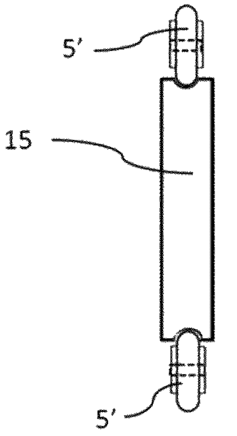
FIG. 28 represents a view in profile of a slide guided by wheels of convex rounded shape.

On the other hand, in a variant represented in FIG. 28 the wheels 5' of the guide have a periphery of rounded section that guides and retains the slide 15, the upper and lower edges of which then feature a groove of concave section. Such wheels and slides are usable in all the embodiments described.

The slide shown in these figures can equally be associated with other guides provided with wheels guiding the edges of the slide.

Figure 5:
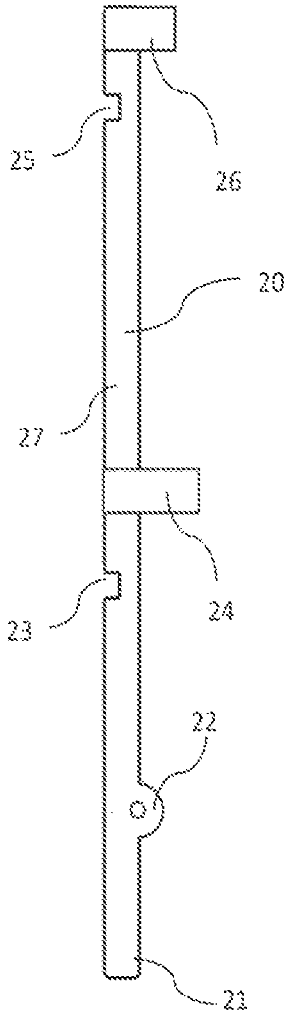
FIG. 5 represents a view in elevation of a clipping lever according to the invention.

Referring to FIG. 5 there is seen a flat clipping lever 20 including, from its front end to its rear end, a part 21 forming a handle or adapted to receive a separate handle, an articulation hole 22, preferably offset toward the upper edge of the lever, a first downwardly open anterior notch or recess 23, a large ferromagnetic lug 24 extending upward, a second downwardly open posterior notch or recess 25, and finally a small ferromagnetic lug 26 extending upwards. The distance between the notches 23 and 25 corresponds to the amplitude of the movement of the slide 15 and therefore of the large wheel between the advanced and retracted positions. Substantially the same applies to the distance between the lugs 24 and 26.

The thickness of the lever 20 may be for example from 3 to 6 mm, the lever possibly being obtained by simply cutting a flat sheet, for example. The width of the lever is sufficiently small for its lower edge 27 to pass over the summit of the abutment 10 when, the lever being raised, the slide 15 moves between its advanced and retracted positions.

In the FIG. 6 embodiment the clipping lever 28 has at its shortened anterior end 29 holes for fixing a handle (not represented) which extends it and the rear end 30 provided with the part 26 is able to carry a preferably cranked rear handle part 31 extending upwards to form or to receive a rear handle that can be raised by a helper walking behind the wheelchair.

It is seen in FIG. 6 that the width of the lever 28 may be increased toward the bottom of the front part to constitute an anterior edge 32 of the notch 23 descending below the lower edge of the lever 27. A result of this is that when the slide 15 is pushed rearwards, the lever being raised, the notched edge 32 ends up abutting against the abutment 10 so that the slide is not able to escape rearwards to exit the guide 1. On the other hand, when the slide is pushed toward its anterior position the axle of the wheel or its axle-bearing surface comes to abut against the bottom of the notch. A wider lever rear part may also be provided so as to have a notch 25 on its rear edge preventing forwards escape of the slide.

In the case of a lever of constant width, such as the lever 20, rearwards escape of the slide may for example be prevented by disposing toward the lower edge of the slide an abutment, for example a screw, carried by the slide and coming to encounter the anterior edge of the abutment 10.

It is seen in FIGS. 7 and 8 that the ferromagnetic lugs 24 and 26 may have a square shape with a thinner extension 33 that can be fixed to the lever by screws passing through corresponding holes in the lever.

A removable or retractable locking element may be provided to prevent rotation of the lever outside its clipping positions, for example if it is not desirable for the handicapped person seated in the wheelchair to be able to actuate the lever. For example, there may be screwed or otherwise fixed to the slide 15 a transverse screw or a detent preventing rotation of the lever. This locking element is preferably easily accessible to a helper. As an alternative there may be fixed to the lever a removable part transverse relative to the lever that can rapidly come to abut against an element or longitudinal member of the wheelchair chassis so as to prevent or to limit rotation of the lever, which then remains in the clipped position.

The lever shown in these figures may equally be associated with a slide different from that shown in FIGS. 3 and 4.

Referring to FIGS. 9 and 10 there is seen a slide 15 onto which has been screwed a handbrake fixing part 34. This part includes a mounting part 35 including a lower vertical core, a flat and an upper vertical core offset relative to the lower core. The lower core is fixed against the slide 15 by screws screwed into the holes 18. The upper core has above the flat a horizontal round cylinder or tube section 36 carried by screws 37 emerging from the upper core. Onto this section, the diameter of which is equal to that of the chair chassis horizontal longitudinal member on which the large rear wheel manual brake is usually fixed, is mounted and clamped the body 38 of the brake 39, formed of two jaws, that has previously been demounted from the chair, the distance between the position of the brake 39 and the axle hole 17 corresponding to the offset of the large wheel axle and the brake in the initial position on its chassis. Thus installing the assembly according to the invention does not necessitate the purchase of a new handbrake.

There is preferably provided in a device of an assembly according to the invention a plurality of cylindrical or tubular sections such as the part 36 having different diameters corresponding to the diameters of the chassis longitudinal members of different chairs, for example a diameter of 20 mm for the part 36, of 22 mm for the part 36*a* (FIG. 11), and of 25 mm for the part 36*b* (FIG. 12). The length of these parts is preferably from 50 to 80 mm.

Figure 13:
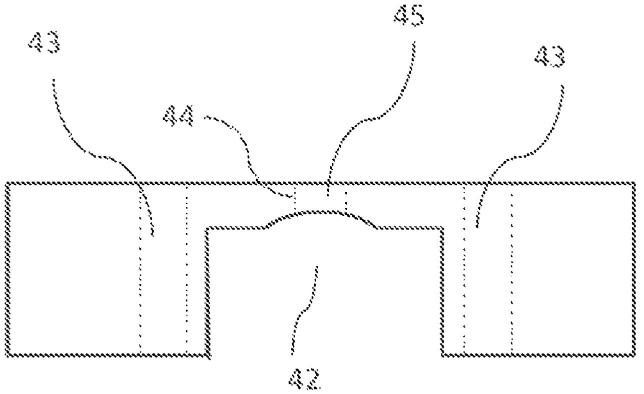
FIG. 13 represents a view from above of a mounting flange for the guide.
Figure 14:
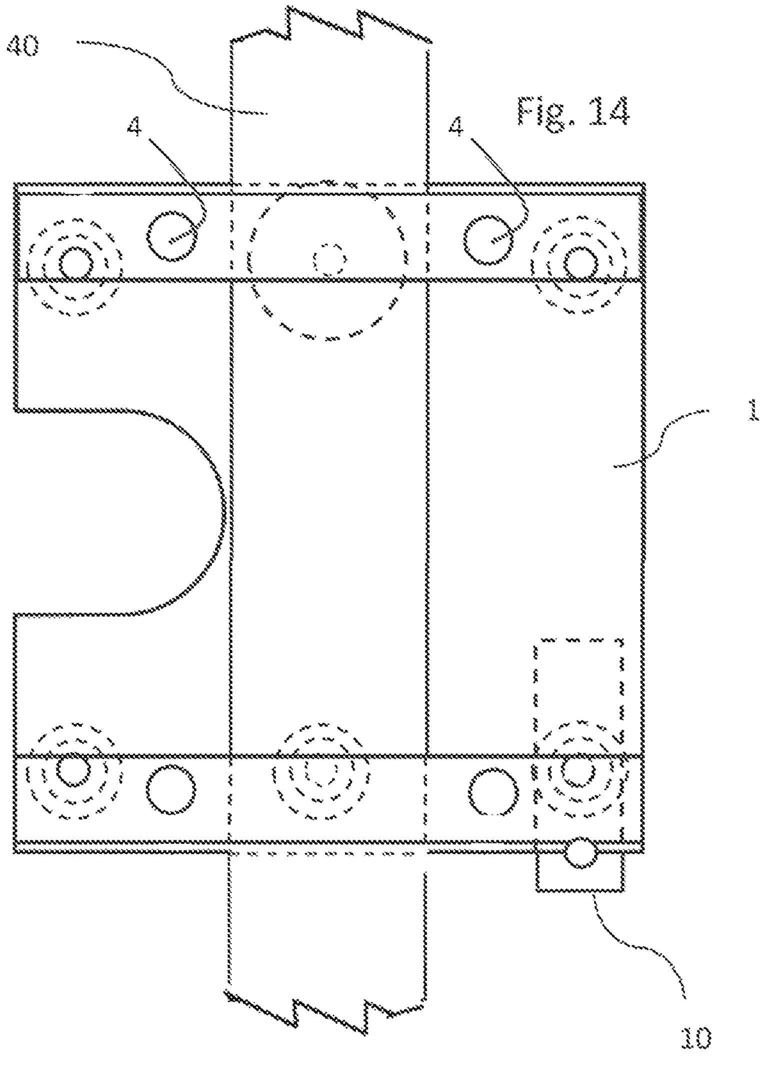
FIG. 14 represents a view in elevation of the guide mounted on a wheelchair chassis upright.

Referring to FIGS. 13 and 14, there is seen a guide plate 1 mounted on the usual rear vertical upright 40 of a manually-driven wheelchair chassis from which the large rear wheel has previously been removed. The plate 1 is clamped against the upright 40 by two clamping flanges 41 featuring a rectangular notch 42 and two holes 43 that align each time with two holes 4 in the plate 1 through which pass clamping screws 44 (see FIGS. 13 and 15, including for the best view of flanges 41 and holes 43) that are screwed into the threaded holes 4.

The bottom of the notch 42 preferably features a circular arc section recess with a threaded central hole 45 into which may be screwed a screw (not represented) that will come to be pressed firmly against the facing surface of the upright 40, or possibly in holes in the chassis upright if it includes such holes.

The width of the notch 42 is preferably of the order of 32 mm and corresponds to the width of the usual square or rectangular section chassis uprights. The notch is therefore also able to receive tubular uprights 40 generally having a diameter of 20, 22 or 25 mm.

As an alternative, in the case of a tubular upright 40 of rounded section two similar flanges may equally be provided but featuring a flared notch with inclined V-shape edges. There may equally be provided a set of pairs of flanges each adapted to a particular section of an upright 40, although the pair of flanges 41 proves effective for very firm fixing of the guide in all cases.

Referring to FIG. 15 there are seen the arrangements relating to the guide 1, the slide and the clipping lever 27, as well as the magnet 7, in the upper part, and the abutment part 10, both carried by the guide 1. A flat concealer 80 is mounted on the slide by means of screws 46 screwed into threaded holes 47 (see FIG. 3) in the slide 15. To simplify the drawing the lugs 24 and 26 have not been represented. It is seen that the various flat components 1, 15, 27 are very close to one another and it is therefore possible to obtain a thickness of the device, including the concealer 80, of less than 30 mm, the distance that usually separates the large rear wheel from the chassis of a chair.

It is also clear that, as an alternative, the slide 15 could be farther away from the guide 1 in order for the lever 20 or 27 to be inserted between them, moving the wheels 5 farther apart and moving the magnet 7 and the abutment part 10 closer together. The arrangement represented in the drawing, which imparts great rigidity to the device, is nevertheless preferred.

Fixing means other than these flanges may also be used, for example collars clamping onto the frame upright.

Figure 16:
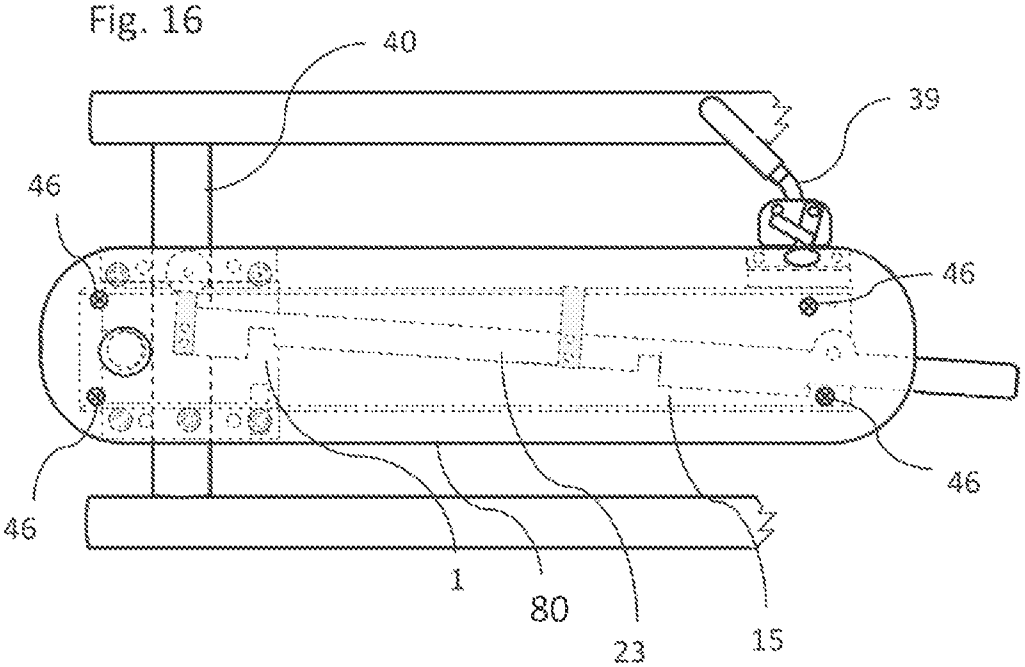
FIG. 16 represents a view in elevation of a device according to the invention in a normal advanced position, mounted on a wheelchair chassis and carrying a concealer.
Figure 17:
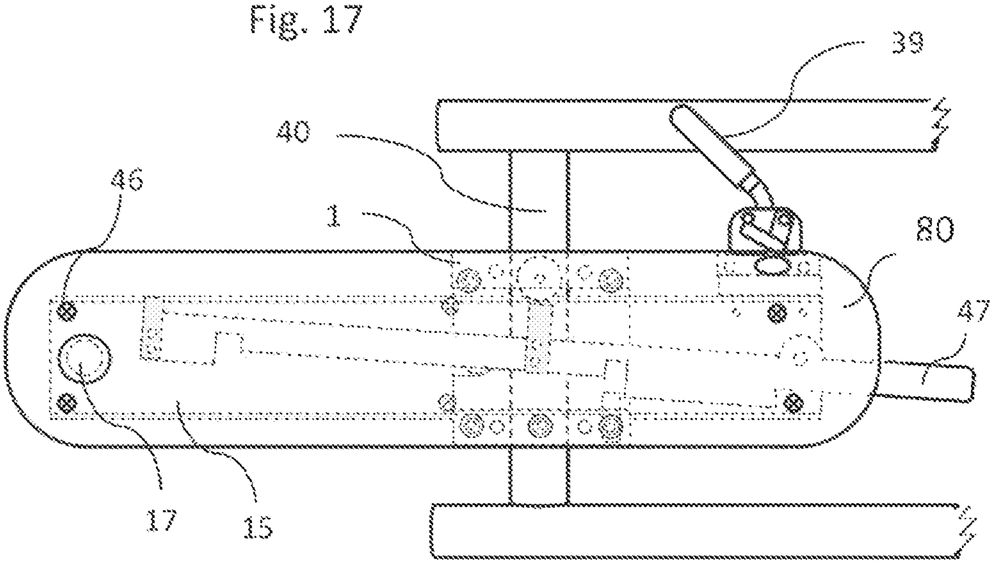
FIG. 17 represents a view in elevation of a device according to the invention in a retracted position, mounted on a wheelchair chassis and carrying a concealer.

Referring to FIGS. 16 and 17 there is seen the device according to the invention mounted on the rear upright 40 of a wheelchair chassis in an advanced, respectively retracted, position and covered by the concealer 80 fixed at a distance on the slide 15 by the screws 46. At its front end the lever 27 carries an actuating handle 47 emerging to a great distance from the front of the slider and the concealer 45, the latter featuring a hole in alignment with the hole 17.

Figure 18:
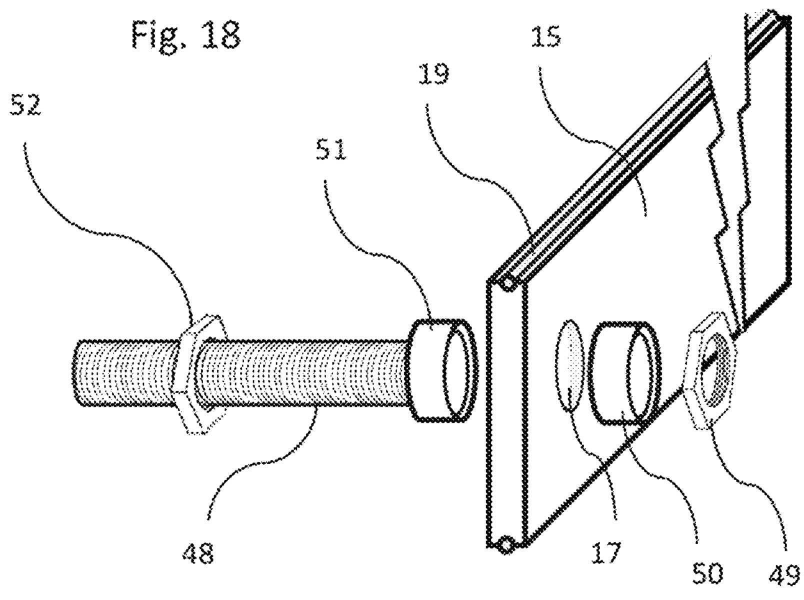
FIG. 18 represents an exploded perspective view of the rear end of the slide and of large rear wheel axle carrier elements.
Figure 19:
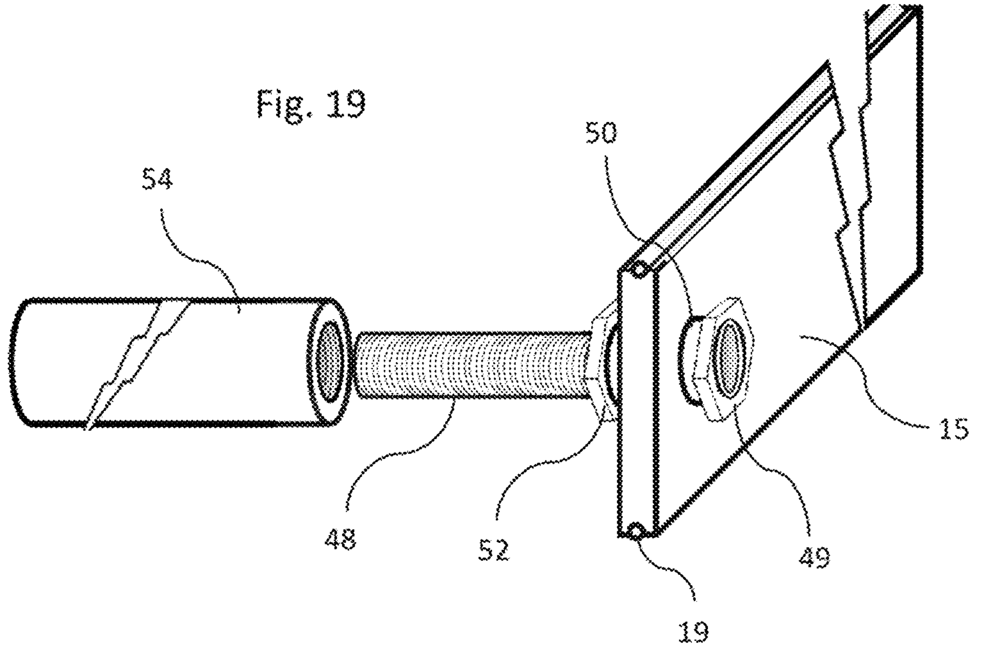
FIG. 19 represents a perspective view of this rear end of the slide in the assembled state.

Refer to FIGS. 18 and 19.

In the usual manner in wheelchairs currently on sale, the hub of the large wheel is mounted on an axle extending from one side of the wheel, this axle being mountable or fixable on an element of the chassis of the chair, generally a rear upright, which generally features a cylindrical hole for this purpose. This axle is itself hollow and contains a fixing rod able to slide in the axle and having radial spring-loaded detents, for example balls, situated at the level of the free end of the axle and coming to engage behind this chassis element to prevent extraction of the axle, this rod including a bolt accessible from the free side of the wheel to cause the rod to slide and to cause the detents to retract in order to render the wheel easily removable and remountable.

To carry the large rear wheel of a wheelchair there is mounted in the rear hole 17 of the slide 15 a cylindrical tubular wheel sleeve or bearing surface 48 intended to receive the large rear wheel axle. The length of this sleeve 48 is preferably identical to that of the bearing surface or the hole usually present on the chair in which the large wheel is normally mounted and the diameter of the cylindrical internal passage of the sleeve 48 is identical to the diameter of this cylindrical hole or bearing surface of the frame. The sleeve 48 is mounted in the hole 17 in the slide 15 and then clamped from the side of the slide facing the wheel by a nut 49, preferably with a washer 50 between them. On the opposite side the sleeve is clamped by another nut 52, preferably with a washer 51 between them, the sleeve being externally threaded to receive these nuts. The length of the part of the sleeve 48 that emerges from the slide on the wheel side is advantageously of the order of 5 to 10 mm.

Once the sleeve has been mounted it suffices to press the wheel axle into the sleeve 48 until the lugs, which rise radially at the free end of the sleeve 48, engage.

The device in the form of a kit may advantageously include a plurality of sleeves 48 of different lengths, for example two sets of different diameter, for wheel axle diameters of 12 mm and 12.7 mm.

However, the sleeve may preferably feature in its cylindrical internal surface where the wheel axle is mounted one or more circular internal grooves, preferably of square or rectangular section, for example 5 mm wide and 5 mm high, into which spring-loaded balls are able to penetrate to prevent extraction of the axle. These grooves are preferably spaced in the following manner starting from the end of the sleeve close to the wheel:

- for a wheel axle of 12 mm diameter: 33 mm, 50 mm, 60 mm; total length of sleeve 75 mm;
- for a wheel axle of 12.7 mm diameter: 51 mm, 56 mm, 60 mm; total length of sleeve 69 mm.

Figure 20:
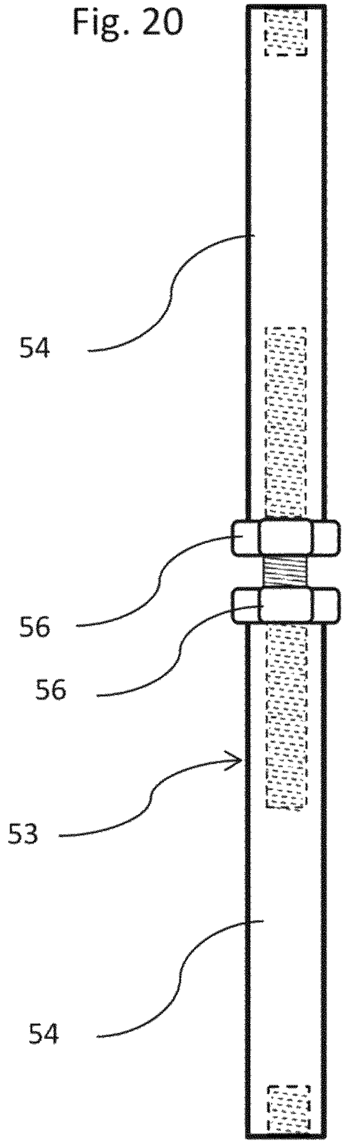
FIG. 20 represents a view in elevation of a crossmember connecting the wheelchair large wheels for an assembly according to the invention in a retracted position.
Figure 21:
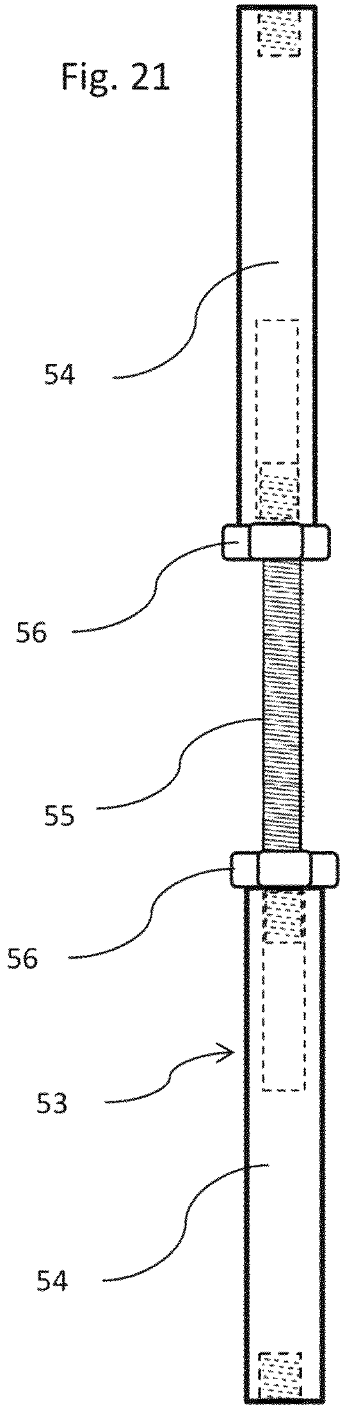
FIG. 21 represents a view in elevation of this crossmember in a deployed position.
Figure 25:
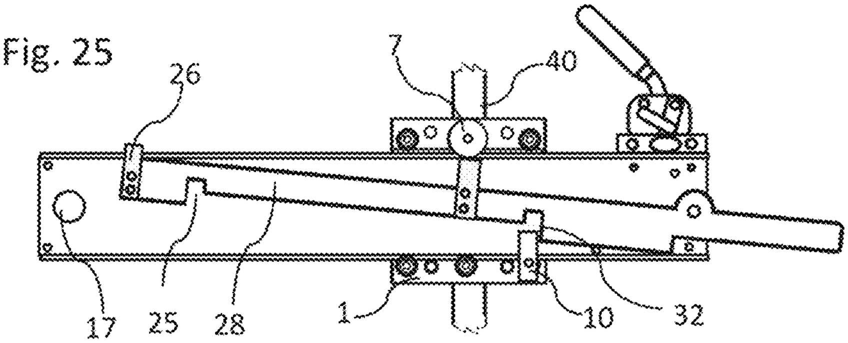
FIG. 25 represents a view in elevation of the slide engaged in the guide in a rear and unclipped position.

Refer to FIGS. 20 and 21.

If two devices according to the invention are mounted, one on each side of the wheelchair, it may be advantageous to join the two wheel sleeves and therefore the two slides by means of a crossmember 53.

This crossmember may advantageously include two tubular sleeves 54 screwed onto the two ends of a threaded central rod 55 with locknuts 56 to retain the parts in the chosen position. Starting from the FIG. 30 retracted position, one of the sleeves 54 is screwed onto one of the sleeves 48 after which the sleeves 54 are moved away from one another until the other sleeve can be screwed onto the other sleeve 48. It is clear that fixing the crossmember to the sleeves 48 or directly to the rear end of each slide may be carried out in any other manner.

The assembly according to the invention may optionally further include a platform, for example in the form of a rigid grid, that is fixed horizontally to the chair chassis behind its seat and the rear edge of which comes to rest on the crossmember, thus enabling transport of an item such as baggage or a basket.

Refer to FIGS. 22 to 25.

There is seen in FIG. 22 the slide 15 in the normal advanced rolling position in which the lever 28 is in a position lowered by gravity, the abutment part 10 entering the rear notch 23. In this position the rear wheel bearing 48 (not represented) mounted in the hole 17 is located in the notch of the guide 1.

To go to the retracted position of the wheel the user lowers the handle 29 of the lever 28, the rear part of the lever then rising to disengage the notch 25 from the abutment 10 (FIG. 23) until the ferromagnetic lug 26 comes into contact with the magnet 7, which therefore holds the lever 28 in the raised position. It then suffices for the user to actuate the wheel and therefore the slide 15 toward the rear. When this movement moves the lug 26 horizontally away from the magnet 7 the lever 28 drops into the lowered position but, the notch 25 having already been moved slightly away from the abutment part 10, the lower edge 27 of the lever drops onto the abutment and slides thereon. The retraction movement of the slide can therefore continue until the anterior notch 23 of the lever 17 reaches the abutment 10, with the result that the lever is lowered again and clipped onto the abutment (FIG. 24). In this position the chair's large wheel is offset towards the rear and therefore no longer forms an obstacle, with the result that a user seated on the chair can slide laterally from their seat to a chair, bed or other furniture or vehicle, without needing to be lifted.

To advance the slide 15 from this retracted position it suffices to lower the handle 29 again (FIG. 25) so that the large lug 24 comes into contact with the magnet 7 and then to actuate the large wheel in an opposite forward movement until the lever 28 comes to be clipped by its posterior notch 25 onto the abutment part 10. It will be noted that in the retracted position in FIG. 25 the slide 15 is not able to retract beyond this rear position because the anterior edge 32 of the notch 23 would be immobilized by the abutment 10.

Figure 26:
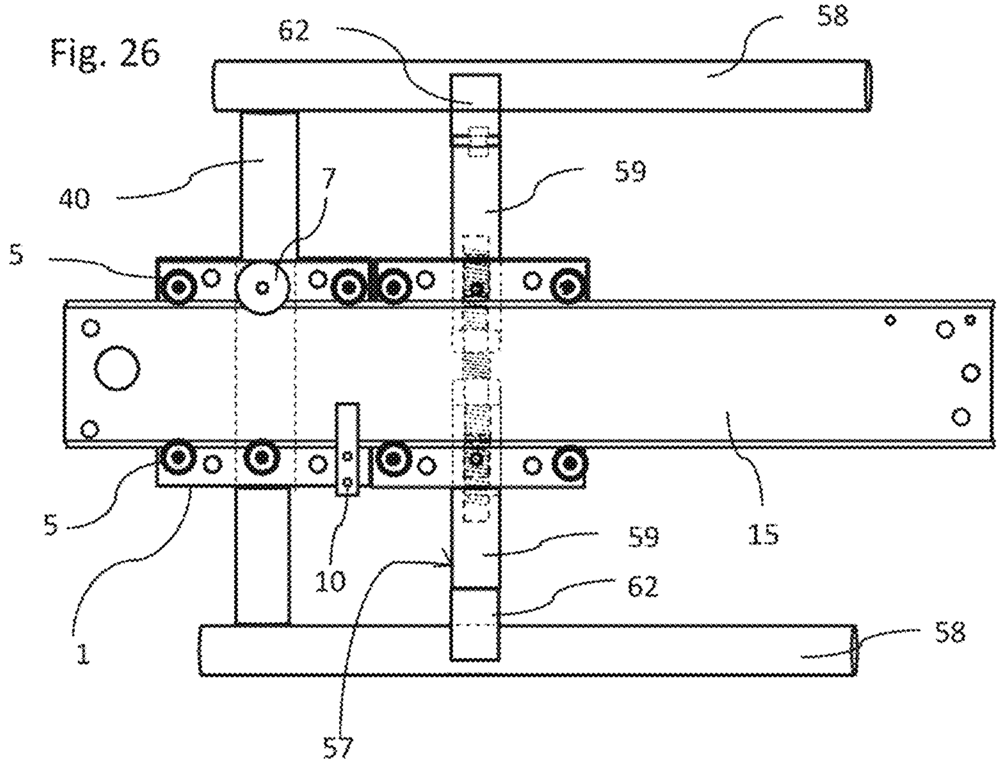
FIG. 26 represents a view in elevation of a device with an elongate guide.
Figure 27:
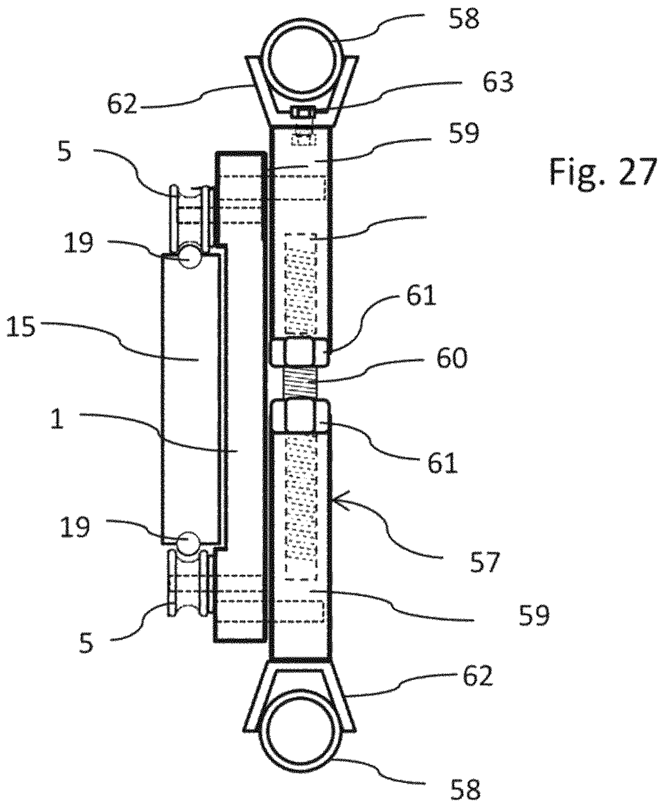
FIG. 27 represents a view in profile of this device mounted on a wheelchair frame.
Figure 29:
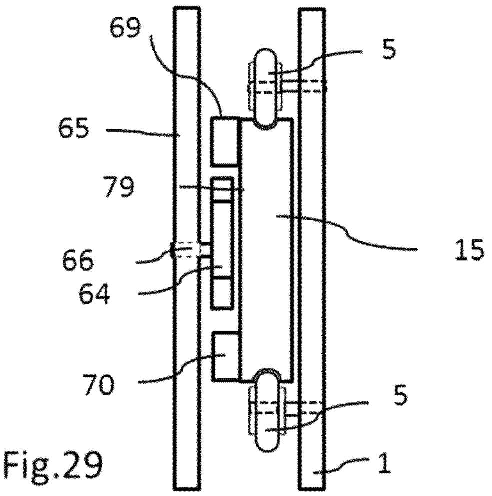
FIG. 29 represents a view in profile from the rear of an assembly in which the lever is articulated on the guide.

Refer to FIGS. 26 and 27.

It may be useful, for example if the wheelchair receives a heavy load, to provide a guide longer than that described hereinabove in order for the slide in the retracted position to be supported by the guide over a greater length.

This can also be achieved using a guide plate that is longer toward the front and advantageously includes wheels aligned along lower and upper edges of the plate.

In an advantageous solution the guide may be formed of two successive guides, namely a guide 1 as described hereinabove and a guide 1' identical to the guide 1 but with no means for its retention in the unclipped position, such as the magnet 7, and the complementary clipping element, such as the abutment 10. The slide 15 is therefore also retained by the wheels 5 of the guide plate 1', including in the retracted position of the rear wheel.

To fix the plate 1' to the chassis or frame of the wheelchair an adjustable vertical upright 57 may be provided that is intended to be clamped between lower and upper longitudinal members 58 of the chassis, including two sleeves 59 respectively screwed onto a stud 60, with two clamping nuts 61, each sleeve having at its free end a flared V-shape bracket 62 mounted to rotate freely about a pin 63 and coming to be pressed against its longitudinal member 58. By moving the sleeves 59 vertically farther apart along the stud 60 it is therefore possible to clamp the removable upright 57 tightly. The guide plate 1' is then fixed, aligned with the guide plate 1, for example using clamping flanges as represented in FIGS. 13 and 14.

The extendable vertical upright 58 can also be used to fix a guide 1 to chairs that do not have an adequate chassis rear upright.

The assembly according to the invention for a wheelchair may include one or two devices according to the invention, preferably in kit form, each device including guide, wheels, magnet, abutment, preferably already mounted on the guide, and two flanges with clamping screws; a slide; a brake mounting part, preferably already mounted on the slide, and its cylindrical part or parts; a clipping lever with its ferromagnetic lugs, preferably already mounted on the slide; a wheel sleeve or different length and/or diameter sleeves and/or including one or more internal grooves, and the nuts and optional rings for fixing the sleeves; preferably, a concealer and its fixing screws; optionally a crossmember.

Refer to FIGS. 29 to 32.

In this other embodiment a lever 64 is articulated to a part or second plane element 65 parallel to the guide 1 and fastened to the latter by fixing means (not represented), for example bolts. The slide 15 is able to move in the space between the plates 1 and 65, retained by the wheels 5 articulated on the guide 1. About a pin 66 carried by the plate 65 toward the front of the guide is articulated the posterior end of the lever 64 that is able to pivot in a vertical plane. The rear end 67 of the lever 64 preferably tapers in the direction toward the pin 66.

By way of retaining means the slide carries on one of its sides and towards its upper edge a posterior magnet 68 which in the advanced position of the guide is located at the level of the anterior edge of the guide 1 and therefore of the plate 65. A second, anterior magnet 69 is also carried laterally by the slide towards its upper edge, the distance between the magnets 68 and 69 being equal to the distance between the advanced and retracted positions of the slide 15. The latter carries on the same side and toward its lower edge two vertical abutments 70 and 71 spaced by this same distance and preferably situated substantially under the magnets 68, 69.

On its lower edge the lever 64 has a notch 72 enabling clipping by gravity alone on the abutments 70, 71, depending on the position of the slide. This notch 72 may advantageously be situated toward the anterior edge of the plate 65 and of the guide 1. On its upper edge the lever 64 has two ferromagnetic parts, one anterior part 73, another posterior part 74, spaced from one another by the distance between the advanced and retracted positions of the slide 15. The posterior part 74 is preferably situated substantially above the notch 72. The ferromagnetic part 74 is farther from the upper edge of the lever 64 and carried or formed by a lug 75.

Operation is as follows.

In the normal advanced rolling position of the slide 15, and therefore of the large rear wheel mounted in the hole 17, the lever 64 is in the lowered position, the rear abutment 71 being clipped in the notch 72 (see FIG. 30, position of the lever represented in dashed line), so that the slide 15 is immobilized. To retract the large wheel the user sitting in the chair raises the lever 64 until the rear ferromagnetic part 74 contacts the posterior magnet 68, immobilizing the lever in the raised position (see FIG. 30, position of the lever represented in solid line). The user then has their hands free and can turn the large wheel, driving the slide 15 rearwards. The magnet 68 then moves away from the part 74 with the result that the lever 67 drops back into the advanced position while the abutment 71 is no longer facing the notch 72 (see FIG. 31).

When the slide 15 reaches its retracted position (see FIG. 32) the front abutment 70 comes to be situated under the notch 72 with the result that it is clipped by gravity into the notch, which immobilizes the slide 15 in its retracted position, the rear ferromagnetic part then being situated at the level of the anterior magnet 69, from which it is spaced vertically.

To advance the slide 15 from this position the user again raises the lever 64 so that the ferromagnetic part 74 comes into contact with the magnet, immobilizing the lever in the raised position and unlocking the clipping action. The user is then able to actuate the large wheel and to cause the slide 15 to advance, with the result that the lever 64, moving away from the magnet 69, drops again, its lower edge sliding on the abutment 70, as far as the advanced position in which the lever is clipped onto the rear abutment 70 (FIG. 30). The anterior part 76 of the lever is preferably thinner than the rest of the lever, with the result that the lever is in a very low position during sliding of the slide.

It is clear that the various embodiments described could be reversed, for example symmetrically relative to the horizontal geometric plane, but in this case it would be necessary to spring-load the lever sufficiently strongly to raise the lever into the clipping position but sufficiently weakly for the lever to be maintained in the unclipped low position when it has been pushed against the retaining means.

If the characteristics of the chair are known, the device or kit may include only one cylindrical brake part and only one wheel sleeve, these parts preferably being already mounted on their respective supports. In this case it is even possible to ship the device with the concealer already mounted and the two flanges with their clamping screws.

The invention claimed is:

1. An assembly for fitting to a wheelchair driven manually by circular push rings on the wheels, said assembly comprising:

at least one device including two parts mobile relative to one another, namely a guide provided with quick fixing means, in particular by clamping, in horizontal position, a wheel slide guided by said guide and having a transverse axle or transverse sleeve for mounting with a rear wheel around the transverse axle or transverse sleeve so that a rotation of said rear wheel on a ground drives the movement of the wheel slide along the guide between an advanced position and a retracted position in which the rear wheel no longer protrudes on the side of the seat of the wheelchair, means for manually actuating respectively an advanced and a retracted position, immobilization means of the wheel slide in said advanced, respectively retracted, position, the length of said elongate wheel slide being such that, in the retracted position, said wheel slide can exit the rear end of the guide with an overhang, the wheel slide remaining retained in the guide by its anterior part, said advanced and retracted position immobilization means including manually unlockable clipping means and unclipped position retaining means enabling the user to free their hands to drive said wheel of the wheelchair between said advanced and retracted positions, and automatic unlocking means enabling return of the manual unlockable clipping means into a clipping position upon movement of the wheel slide, wherein said manually unlockable clipping means include an elongate lever articulated in pivoting manner on one of the wheel slide or the guide and actuatable by a hand lever, said lever and the one of the wheel slide or the guide that does not carry said lever including respective complementary clipping elements, namely two complimentary clipping elements spaced by a distance equal to the distance between said advanced and retracted positions, and an abutting element, adapted to be clipped together when said wheel slide reaches the advanced, respectively retracted, position, said lever being able to pivot between an unclipped position and a clipped position.

2. The assembly as claimed in claim 1, wherein the lever is articulated on the wheel slide and includes said complimentary clipping elements, the guide carrying the abutting element.

3. The assembly as claimed in claim 1, wherein the lever is articulated on the fixed guide, the wheel slide including said complimentary clipping elements, the lever including said abutting element.

4. The assembly as claimed in claim 1, wherein the lever includes an articulation and in that the position of the articulation of the lever enables the lever to return to the clipped position by gravity alone, after the movement of the wheel slide has moved said lever away from the unclipped position maintaining means.

5. The assembly as claimed in claim 4, wherein the articulation is situated toward one of the ends of the lever.

6. The assembly as claimed in claim 1, wherein the lever has clipping reliefs separated along the lever by a distance corresponding to the travel of the wheel slide between the advanced and retracted wheel positions and intended to clip into a complementary notch on the guide.

7. The assembly as claimed in claim 6, wherein the complimentary notch is fixed, and the anterior clipping relief of the lever is configured to retract and to come to abut against the complimentary relief, hole or notch preventing the lever from retracting farther, even in an unclipped raised position.

8. The assembly as claimed in claim 6, wherein the assembly further comprises an unclipped raised position maintaining means, the unclipped raised position maintaining means including magnets.

9. The assembly as claimed in claim 6, wherein an upper edge of the lever has a ferromagnetic part at the level of the clipping relief to cooperate with said magnets when the lever is raised.

10. The assembly as claimed in claim 6, wherein the guide includes a plane vertical element having on one side fixing means for fixing the guide to a part of the chassis of the wheel chair and on the other side rolling members retaining and guiding the wheel slide, said slide including an elongate flat element retained and guided by said rolling members, the clipping reliefs having a flat elongate blade shape extending parallel to the wheel slide.

11. The assembly as claimed in claim 10, wherein the assembly comprises grooved wheels and said plane vertical element of the wheel slide is retained and guided over and under its longer edges by said grooved wheels.

12. The assembly as claimed in claim 9, wherein the fixing means are clamping flanges able to be clamped to a wheel chair chassis vertical bar.

13. The assembly as claimed in claim 1, the guide has a notch open toward the rear to receive the transverse axle or transverse sleeve in the advanced position.

14. The assembly as claimed in claim 1, wherein the assembly comprises two devices, each device include two parts mobile relative to one another, namely a guide and a wheel slide guided by said guide, and wherein the assembly further includes a crossmember joining the rear ends of the two wheel slides of the assembly.

15. The assembly as claimed in claim 1, wherein the wheelchair comprises a wheel brake featuring a base to be fixed to an upper edge of the wheel slide and a cylindrical section of the chassis portion of the wheelchair.

16. The assembly as claimed in claim 1, wherein said assembly includes a platform to support baggage, the platform coming to rest horizontally on the rear end of the wheel slides, an anterior edge of this platform being connected to the rear of the wheelchair chassis or, to the wheel slides.

17. The assembly as claimed in claim 10, wherein the guide is a first plane element carrying at a certain distance a second plane element that is parallel to the first plane element, the wheel slide, the rolling members and the lever being disposed in the space separating the two elements, said second plane element being connected to the first plane element by firm connections preventing the wheel slide from moving away from the wheelchair.

18. The assembly as claimed in claim 1, wherein the assembly includes an extendable vertical upright to be clamped between lower and upper longitudinal frame members of the wheelchair.

19. The assembly as claimed in claim 1, wherein the thickness of the assembly is less than or equal to 30 mm.

20. The assembly as claimed in claim 1, wherein the lever has holes separated along the lever by a distance corresponding to the travel of the wheel slide between the advanced and retracted wheel positions and intended to clip into a notch on the guide.

21. The assembly as claimed in claim 1, wherein the lever has notches separated along the lever by a distance corresponding to the travel of the wheel slide between the advanced and retracted wheel positions and intended to clip into a relief on the guide.

* * * * *